(12) United States Patent
Xie

(10) Patent No.: US 11,358,565 B1
(45) Date of Patent: Jun. 14, 2022

(54) VEHICLE AUTHENTICATION SYSTEM AND VEHICLE AUTHENTICATION METHOD BASED ON BLUETOOTH LOW ENERGY AND FINGERPRINT

(71) Applicants: HYUNDAI MOTOR COMPANY, Seoul (KR); KIA CORPORATION, Seoul (KR)

(72) Inventor: Hui Xie, Shandong (CN)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 0 days.

(21) Appl. No.: 17/324,643

(22) Filed: May 19, 2021

(30) Foreign Application Priority Data

Jan. 4, 2021 (CN) .......................... 202110001859.4

(51) Int. Cl.
| | | |
|---|---|---|
| *B60R 25/24* | (2013.01) | |
| *B60R 25/25* | (2013.01) | |
| *B60R 25/01* | (2013.01) | |
| *G07C 9/00* | (2020.01) | |
| *H04W 4/80* | (2018.01) | |

(52) U.S. Cl.
CPC ............ *B60R 25/245* (2013.01); *B60R 25/01* (2013.01); *B60R 25/252* (2013.01); *G07C 9/00309* (2013.01); *H04W 4/80* (2018.02); *B60R 2325/101* (2013.01); *B60R 2325/205* (2013.01); *G07C 2009/00325* (2013.01); *G07C 2009/00539* (2013.01); *G07C 2009/00769* (2013.01)

(58) Field of Classification Search
None
See application file for complete search history.

(56) References Cited

U.S. PATENT DOCUMENTS

| | | | |
|---|---|---|---|
| 10,486,647 B2 * | 11/2019 | Lee ..................... | B60R 25/255 |
| 10,632,970 B2 * | 4/2020 | Lee ..................... | G07C 9/00563 |
| 2019/0107095 A1 * | 4/2019 | Imai .................... | G06V 40/13 |
| 2019/0248333 A1 * | 8/2019 | Lee ..................... | B60R 25/252 |
| 2020/0062218 A1 * | 2/2020 | Lee ..................... | B60R 25/25 |
| 2021/0309182 A1 * | 10/2021 | Ragunathan ........... | B60R 25/01 |

* cited by examiner

*Primary Examiner* — Carlos Garcia
(74) *Attorney, Agent, or Firm* — McDonnell Boehnen Hulbert & Berghoff LLP

(57) ABSTRACT

A vehicle authentication system and a vehicle authentication method based on BLE and fingerprint are provided. The vehicle authentication system includes an audio/video/navigation/telematics (AVNT) smart interconnection device, a driver-side door handle fingerprint identification device, a vehicle starting button fingerprint identification device, a fingerprint authentication controller, and a central control processor.

17 Claims, 5 Drawing Sheets

VEHICLE AUTHENTICATION SYSTEM AND VEHICLE AUTHENTICATION METHOD BASED ON BLUETOOTH LOW ENERGY AND FINGERPRINT

CROSS-REFERENCE TO RELATED APPLICATION

This application claims the priority to and the benefit of Chinese Patent Application No. 202110001859.4 filed on Jan. 4, 2021, the entire contents of which are incorporated herein by reference.

TECHNICAL FIELD

The present disclosure relates to an automobile authentication technology and, in particular, to a vehicle authentication system based on Bluetooth Low Energy (BLE) and fingerprint.

BACKGROUND

With development of science and technology and improvement of the standard of living, popularity of vehicles is increasing. As relatively high-value consumer products used as an alternative means of walking, convenience of vehicle use is increasingly attracting attention from people. At present, unlocking and starting of a vehicle is mostly controlled by a vehicle key, and a vehicle user needs to press a relevant button of the vehicle key near the vehicle to realize locking and unlocking. In the same way, the key needs to be inserted into a locking hole and rotated to realize the starting of a vehicle. This traditional way of unlocking and starting greatly weakens the convenience of the vehicle use.

In order to improve the convenience of the vehicle use, keyless entry systems and one-key starting systems are increasingly applied to medium-sized and luxury vehicles. Using radio frequency technology and vehicle identification code recognition systems, the vehicle user can realize unlocking and starting functions of the vehicle without any operation on the key. However, these two systems still require the vehicle user to carry the vehicle key, and keyless entry and one-key starting functions cannot be realized if the vehicle user does not carry the key.

In recent years, biometric technology has developed rapidly. Since the biometric technology is based on inherent physiological characteristics of a human body for identity authentication, the biometric technology has better security, confidentiality, and convenience, and is widely used in electronic products such as mobile phones, laptops, and tablets. As an advanced recognition technology, there are still many technical problems in applying the biometric technology to a field of vehicles. For example, since the vehicles are often exposed to natural environments such as high temperature, severe cold, wind, and rain, usage environment of the vehicles are more severe than that of electronic products. Therefore, in order to improve the convenience of the vehicle users while ensuring functional reliability, a technical solution that enables locking/unlocking and starting of the vehicle in a variety of ways is required.

The above information disclosed in this Background section is only for enhancement of understanding of the background of the disclosure, and therefore it may contain information that does not form the prior art that is already known in this country to a person of ordinary skill in the art.

SUMMARY

The present disclosure provides a vehicle authentication system and a vehicle authentication method based on Bluetooth low energy (BLE) and fingerprint.

In some forms of the present disclosure, a vehicle authentication system based on BLE and fingerprint is provided. The vehicle authentication system may include: an AVNT smart interconnection device mounted in a vehicle and configured to detect a mobile device within a predetermined range from a vehicle, to establish a communication with the detected mobile device via Bluetooth communication to obtain a BLE authentication information of the detected mobile device, and to compare the obtained BLE authentication information with a pre-stored BLE authentication information to send a BLE authentication result to a central control processor in an encrypted manner; a driver-side door handle fingerprint identification device mounted at a driver-side door handle and configured to detect a fingerprint information of a vehicle user and to send the detected fingerprint information to a fingerprint authentication controller in an encrypted manner; a vehicle starting button fingerprint identification device mounted on a starting button in the vehicle and configured to detect the fingerprint information of the vehicle user and to send the detected fingerprint information to the fingerprint authentication controller in an encrypted manner; the fingerprint authentication controller mounted in the vehicle and configured to receive the fingerprint information from the driver-side door handle fingerprint identification device or the fingerprint information from the vehicle starting button fingerprint identification device and to compare the received fingerprint information with a pre-stored fingerprint authentication information to send a fingerprint authentication result in an encrypted manner; and the central control processor mounted in the vehicle and configured to receive the fingerprint authentication result from the fingerprint authentication controller, wherein the central control processor is configured to: detect a signal of pressing a driver-side door button or the starting button of the vehicle, detect whether a vehicle key exists and send a detection request message to the AVNT smart interconnection device and the fingerprint authentication controller when receiving the signal of pressing the driver-side door button or the starting button of the vehicle, and check a detection result of whether the vehicle key exists, the BLE authentication result from the AVNT smart interconnection device, and the fingerprint authentication result from the fingerprint authentication controller sequentially in a predetermined priority to control unlocking a vehicle door or a vehicle starting.

The predetermined range from the vehicle may be a distance range between the mobile device and the AVNT smart interconnection device and be within 3 m.

The central control processor may be further configured to: execute unlocking the vehicle door or the vehicle starting according to the detection result of whether the vehicle key exists when receiving the detection result that the vehicle key exists; execute unlocking the vehicle door or the vehicle starting according to the BLE authentication result from the AVNT smart interconnection device when receiving the detection result that the vehicle key does not exist; and execute unlocking the vehicle door or the vehicle starting according to the fingerprint authentication result from the fingerprint authentication controller when receiving the BLE authentication result that an authenticated mobile device does not exist.

The AVNT smart interconnection device may determine that the mobile device is an authenticated mobile device when comparing the obtained BLE authentication information with the pre-stored BLE authentication information and determining that the obtained BLE authentication information coincides with the pre-stored BLE authentication information, and send the BLE authentication result together with a distance information between the authenticated mobile device and the AVNT smart interconnection device to the central control processor.

The execution of unlocking the vehicle door or the vehicle starting according to the BLE authentication result from the AVNT smart interconnection device may include: enabling execution of unlocking the vehicle door when a distance between the authenticated mobile device and the AVNT smart interconnection device is within 3 m; and enabling execution of the vehicle starting when the distance between the authenticated mobile device and the AVNT smart interconnection device is 1 m±0.2 m.

The fingerprint authentication controller may determine that the received fingerprint information is an authenticated fingerprint information when comparing the received fingerprint information with the pre-stored fingerprint authentication information and determining that the received fingerprint information coincides with the pre-stored fingerprint authentication information.

A communication among the central control processor, the AVNT smart interconnection device, and the fingerprint authentication controller may be performed through a controller area network (CAN) and be encrypted.

The vehicle authentication system may further include a warning module, wherein the warning module is mounted at an integrated display panel in the vehicle and is configured to display a logo of "No Fob+BLE+Fingerprint" when none of the vehicle key, the authenticated mobile device, and the authenticated fingerprint information is detected.

In some forms of the present disclosure, a vehicle including a vehicle authentication system based on BLE and fingerprint.

In some forms of the present disclosure, a vehicle authentication method based on Bluetooth low energy (BLE) and fingerprint is provided. The vehicle authentication method may include: detecting, by an AVNT smart interconnection device, a mobile device within a predetermined range from a vehicle, establishing a communication with the detected mobile device via Bluetooth communication, comparing an obtained BLE authentication information with a pre-stored BLE authentication information, and sending a BLE authentication result to a central control processor in an encrypted manner; detecting, by a driver-side door handle fingerprint identification device, a fingerprint information of a vehicle user and sending the detected fingerprint information to a fingerprint authentication controller in an encrypted manner; detecting, by a driver-side door handle fingerprint identification device, a fingerprint information of a vehicle user and sending the detected fingerprint information to a fingerprint authentication controller in an encrypted manner; detecting, by a vehicle starting button fingerprint identification device, the fingerprint information of the vehicle user and sending the detected fingerprint information to the fingerprint authentication controller in an encrypted manner; receiving, by the fingerprint authentication controller, the fingerprint information from the driver-side door handle fingerprint identification device or the fingerprint information from the vehicle starting button fingerprint identification device, comparing the received fingerprint information with a pre-stored fingerprint authentication information, and sending a fingerprint authentication result to the central control processor in an encrypted manner; and detecting, by the central control processor, a signal of pressing a driver-side door button or a vehicle starting button of the vehicle, detecting whether a vehicle key exists when receiving the signal of pressing the driver-side door button or the vehicle starting button of the vehicle, sending a detection request message to the AVNT smart interconnection device and the fingerprint authentication controller, and checking a detection result whether the vehicle key exists, the BLE authentication result from the AVNT smart interconnection device, and the fingerprint authentication result from the fingerprint authentication controller sequentially in a predetermined priority to control unlocking a vehicle door or a vehicle starting.

The predetermined range from the vehicle may be a distance range between the mobile device and the AVNT smart interconnection device, and be within 3 m.

The vehicle authentication method may further include: executing, by the central control processor, the unlocking the vehicle door or the vehicle starting according to the detection result of whether the vehicle key exists when receiving the detection result that the vehicle key exists; executing, by the central control processor, unlocking the vehicle door or the vehicle starting according to the BLE authentication result from the AVNT smart interconnection device when receiving the detection result that the vehicle key does not exist; and executing, by the central control processor, unlocking the vehicle door or the vehicle starting according to the fingerprint authentication result from the fingerprint authentication controller when receiving the BLE authentication result that an authenticated mobile device does not exist.

The vehicle authentication method may further include: comparing, by the AVNT smart interconnection device, the obtained BLE authentication information with the pre-stored BLE authentication information, determining that the mobile device is an authenticated mobile device when the obtained BLE authentication information coincides with the pre-stored BLE authentication information, and sending the BLE authentication result together with a distance information between the authenticated mobile device and the AVNT smart interconnection device to the central control processor.

The execution of unlocking the vehicle door or the vehicle starting according to the BLE authentication result from the AVNT smart interconnection device may include: executing unlocking the vehicle door when a distance between the authenticated mobile device and the AVNT smart interconnection device is within 3 m; and executing the vehicle starting when the distance between the authenticated mobile device and the AVNT smart interconnection device is 1 m±0.2 m.

The vehicle authentication method may further include: determining, by the fingerprint authentication controller, that the received fingerprint information is an authenticated fingerprint information when the received fingerprint information is compared with and coincides with the pre-stored fingerprint authentication information.

A communication among the central control processor, the AVNT smart interconnection device, and the fingerprint authentication controller may be performed through a controller area network (CAN) and be encrypted.

The vehicle authentication method may further include: displaying a logo of "No Fob+BLE+fingerprint" when none of the vehicle key, the authenticated mobile device, and the authenticated fingerprint information is detected.

By adopting the above-mentioned technical schemes, the present disclosure has following beneficial effects.

By means of Bluetooth positioning and fingerprint authentication, the present disclosure makes it possible to use vehicle keys, Bluetooth devices or fingerprints to control functions such as unlocking the door, starting the vehicle, and locking the vehicle, thereby improving convenience of vehicle use.

DRAWINGS

Some forms of the present disclosure will hereinafter be described in more detail in conjunction with the accompanying drawings. For the sake of clarity, the same components in different drawings are shown with the same reference numerals. It should be noted that the drawings are merely illustrative, and are not necessarily to scale.

DETAILED DESCRIPTION

Exemplary forms of the present disclosure will hereinafter be described in detail and are implemented by the technical solution of the present disclosure. Although detailed implementations and specific procedures are described, the present disclosure is not limited to the following implementations.

Figure 1:
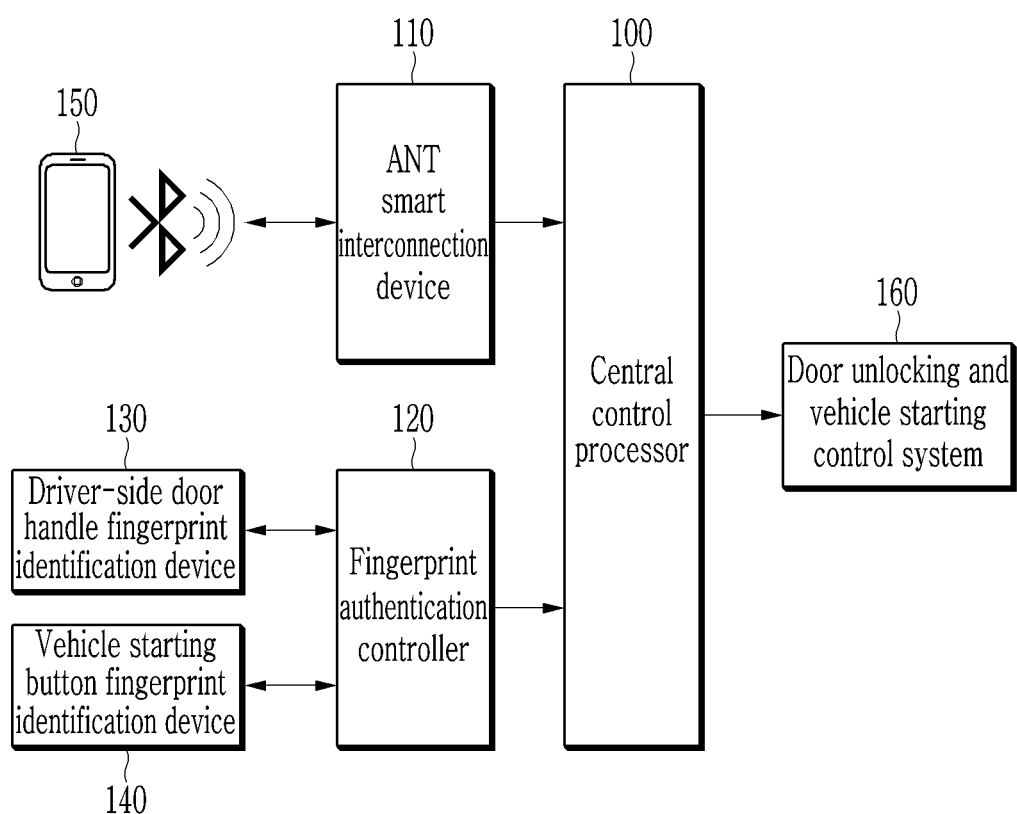
FIG. 1 is a block diagram of a vehicle authentication system based on BLE and fingerprint in some forms of the present disclosure.

FIG. 1 is a block diagram of a vehicle authentication system based on BLE and fingerprint in some forms of the present disclosure. A vehicle authentication system in some forms of the present disclosure includes a central control processor 100, an AVNT (Audio Video Navigation Telematics) smart interconnection device 110, a fingerprint authentication controller 120, a driver-side door handle fingerprint identification device 130, a vehicle starting button fingerprint identification device 140, a mobile device 150, and a door unlocking and vehicle starting control system 160.

When the mobile device 150 of a user moves close to a vehicle, the mobile device 150 of the user establishes a communication connection through BLE (Bluetooth Low Energy) technology and the AVNT smart interconnection device 110 in the vehicle and exchanges data to achieve unlocking and starting functions of the vehicle.

The door unlocking and vehicle starting control system 160 can control unlocking a vehicle door and starting according to instruction from the central control processor.

The AVNT smart interconnection device 100 integrates application functions such as an AI smart language control, a remote control, a real-time mobile phone interconnection, a GPS navigation, and so on. The BLE technology is a short-range, low-cost, and interoperable wireless technology and can minimize power consumption using various intelligent means. The AVNT smart interconnection device 100 controls a Bluetooth module to detect the mobile device 150 of the user and establishes a wireless connection with the mobile device 150 of the user.

When a signal of pressing a driver-side door button of the vehicle or a vehicle starting button is detected, the central control processor 100 can send a request message to the AVNT smart interconnection device 110 for detecting whether the mobile device 150 exists within a predetermined range from the vehicle.

Alternatively, when a signal of pressing a passenger-side door button of the vehicle is detected, the central control processor 100 may send the request message to the AVNT smart interconnection device 110 for detecting whether the mobile device 150 exists within the predetermined range from the vehicle.

Alternatively, when a signal of pressing a trunk open button of the vehicle is detected, the central control processor 100 may send the request message to the AVNT smart interconnection device 110 for detecting whether the mobile device 150 exists within the predetermined range from the vehicle.

Figure 2:
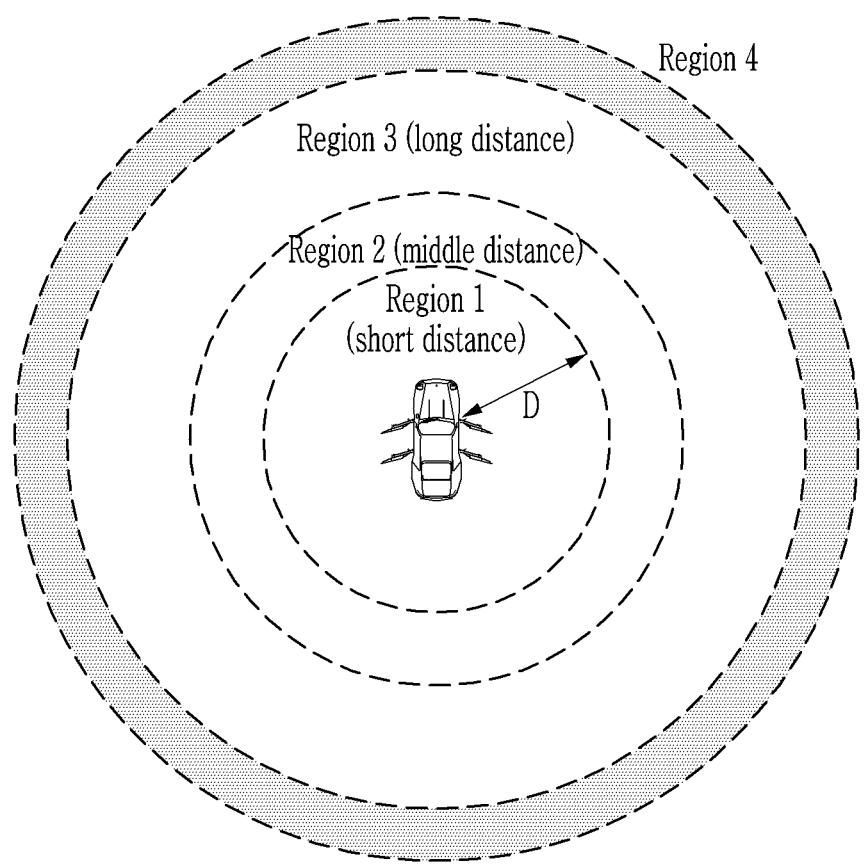
FIG. 2 is a schematic diagram of a predetermined range from a vehicle in a vehicle authentication system based on BLE and fingerprint in some forms of the present disclosure.

In some forms of the present disclosure, the predetermined range from the vehicle means a distance D between the mobile device 150 and the AVNT smart interconnection device 100 and FIG. 2 is a schematic diagram illustrating a distance range between the mobile device 150 and the AVNT smart interconnection device 100. In some forms of the present disclosure, whether the distance between the mobile device 150 and the AVNT smart interconnection device 100 is within the predetermined range from the vehicle (that is, the distance is included in a region 0 or a region 1) is detected. The predetermined range from the vehicle is within 3 m, but the present disclosure is not limited thereto.

TABLE 1

| Region | The distance between the mobile terminal and the AVNT intelligent interconnection device |
|---|---|
| Region 0 | Usually 1 m ± 0.2 m (short distance, vehicle starting function can be used) |
| Region 1 | Within 3 m (short distance, door unlocking function can be used) |
| Region 2 | 12 m to 15 m (middle distance) |
| Region 3 | Minimum 300 m ± 3 m (long distance) |
| Region 4 | Over 300 m |

When the AVNT smart interconnection device 110 receives a detection request message from the central control processor 100, the AVNT smart interconnection device 110 can detect the mobile device 150 within the predetermined range from the vehicle, establish a connection with the detected mobile device 150 through Bluetooth communication to obtain a BLE authentication information of the detected mobile device 150, and compare the obtained BLE authentication information with a pre-stored BLE authentication information. If the obtained BLE authentication information coincides with the pre-stored BLE authentication information, the AVNT smart interconnection device 110 determines that the mobile device 150 is an authenticated mobile device, and sends the BLE authentication result and a distance information between the authenticated mobile device and the AVNT smart interconnection device to the central control processor 100 in an encrypted manner.

If the distance between the authenticated mobile device and the AVNT smart interconnection device is within 3 m the vehicle door can be unlocked, and if the distance between the authenticated mobile device and the AVNT smart interconnection device is 1 m±0.2 m the vehicle can be started.

The BLE authentication information of the mobile device 150 is used to identify the detected mobile device, and includes, but is not limited to, an identification code information of the mobile device, a password information sent from the mobile device, a PIN code information sent from the mobile device, and the like.

In some forms of the present disclosure, the mobile device 150 may be, but not limited to, various personal computers, notebook computers, smart phones, tablet computers, and portable wearable devices. Preferably, the mobile device may be a smart phone.

In order to ensure a security of the BLE authentication information of the mobile device 150, the BLE authentication information of the mobile device 150 should be stored securely using an encryption key storing manner and the like. The AVNT smart interconnection device 100 pre-stores the BLE authentication information of the mobile device 150 in a learning manner.

The driver-side door handle fingerprint identification device 130 can be mounted on an inner side of a driver-side door handle, detect a fingerprint information of a vehicle user, and send the detected fingerprint information to the fingerprint authentication controller 120 in an encrypted manner. The vehicle starting button fingerprint identification device 140 can be mounted on a starting button in the vehicle, detect the fingerprint information of the vehicle user, and send the detected fingerprint information to the fingerprint authentication controller 120 in an encrypted manner.

Both the driver-side door handle fingerprint identification device 130 and the vehicle starting button fingerprint identification device 140 include a fingerprint sensor. If a finger contacts the fingerprint sensor, the fingerprint sensor detects a fingerprint. The fingerprint sensor includes optical fingerprint sensors, semiconductor capacitive sensors, semiconductor thermal detecting sensors, semiconductor pressure sensors, ultrasonic wave sensors, wireless frequency sensors, and the like.

The fingerprint authentication controller 120 can be mounted in the vehicle, receive the fingerprint information from the driver-side door handle fingerprint identification device 130 or the fingerprint information from the vehicle starting button fingerprint identification device 140, compare the received fingerprint information with a pre-stored fingerprint authentication information, and send a fingerprint authentication result to the central control processor 100 in an encrypted manner.

The communication between the central control processor 100 and the AVNT smart interconnection device 100 and between the central control processor 100 and the fingerprint authentication controller 120 is performed through CAN (Controller Area Network), but is not limited to the CAN. In addition, encrypted communication manner between the central control processor 100 and the AVNT smart interconnection device 110 may be the same as or different from that between the central control processor 100 and the fingerprint authentication controller 120.

When the central control processor 100 detects a signal of pressing the vehicle driver-side door button or the vehicle starting button, the central control processor 100 send the detection request message to the fingerprint authentication controller 120. When the fingerprint authentication controller 120 receives the detection request message from the central control processor 100, the fingerprint authentication controller 120 obtains the fingerprint information from the driver-side door handle fingerprint identification device 130 and the vehicle starting button fingerprint identification device 140, compares the obtained fingerprint information with the pre-stored fingerprint authentication information, and determines that the obtained fingerprint information is an authenticated fingerprint information if the obtained fingerprint information coincides with the pre-stored fingerprint authentication information.

In order to ensure a security of the fingerprint information of the vehicle user, the fingerprint authentication controller 120 should be stored securely using an encryption key storing manner and the like. The fingerprint authentication controller 120 pre-stores the fingerprint information of the vehicle user in a learning manner.

The vehicle authentication system in some forms of the present disclosure may further include a passenger-side door handle fingerprint identification device, and the passenger-side door handle fingerprint identification device may be mounted on an inner side of a passenger-side door handle, detect the fingerprint information of the vehicle user, and send the detected fingerprint information to the fingerprint authentication controller 120 in an encrypted manner. The fingerprint authentication controller 120 obtains the fingerprint information from the passenger-side door handle fingerprint identification device, compares the obtained fingerprint information with the pre-stored fingerprint authentication information, and sends the fingerprint authentication result to the central control processor 100 in an encrypted manner. If the central control processor 100 detects a signal of pressing the passenger-side door button of the vehicle, the central control processor 100 sends the detection request message to the fingerprint authentication controller 120.

The vehicle authentication system in some forms of the present disclosure may further include a trunk fingerprint identification device, and the trunk fingerprint identification device may be mounted on the trunk open button, detect the fingerprint information of the vehicle user, and send the detected fingerprint information to the fingerprint authentication controller 120 in an encrypted manner. The fingerprint authentication controller 120 can obtain the fingerprint information from the trunk fingerprint identification device, compare the obtained fingerprint information with the pre-stored fingerprint authentication information, and send the fingerprint authentication result to the central control processor 100 in an encrypted manner. When the central control processor 100 detects a signal of pressing the trunk open button of the vehicle, the central control processor 100 send the detection request message to the fingerprint authentication controller 120.

If necessary, some forms of the present disclosure may further include a fingerprint recognition device, and the fingerprint recognition device may be mounted on, for example, the inner side of the driver-side door handle, the inner side of the passenger-side door handle, the vehicle starting button, the trunk open button, and the like.

If the central control processor 100 receives a detection result that the vehicle key exists, the central control processor 100 executes unlocking the vehicle door or the vehicle starting according to the detection result of the vehicle key. Here, since detection of the vehicle key is well known to a person skilled in the art, description thereof will be omitted.

In addition, if the central control processor 100 receives a detection result that the vehicle key does not exist, the central control processor 100 executes the unlocking the vehicle door or the vehicle starting according to the BLE authentication result from the AVNT smart interconnection device 110.

In addition, if the central control processor 100 receives the BLE authentication result that the authenticated mobile device does not exist, the central control processor 100 executes the unlocking the vehicle door or the vehicle starting according to the fingerprint authentication result from the fingerprint authentication controller 120.

In addition, the vehicle authentication system in some forms of the present disclosure may further include a warning module, and the warning module may be mounted on an integrated display panel in the vehicle. However, a mounting position of the warning module may not be limited to the integrated display panel in the vehicle and be any other position of the. If none of the vehicle key, the authenticated mobile device, and the authenticated fingerprint information is detected, the warning module displays a logo of "No Fob+BLE+fingerprint".

Since the exemplary form of the present disclosure provides the vehicle authentication system which controls the vehicle unlocking and starting based on the BLE and the fingerprint, the vehicle can be used more conveniently and safely. For example, since the BLE method cannot be used but the fingerprint method can still work normally when the smart phone is out of power and cannot be turned on, the exemplary form of the present disclosure can prevent the vehicle user from being unable to unlock the door and start the vehicle due to no power of the smart phone. Further, fingerprint recognition may be affected by bad weather or an environment with strong electromagnetic radiation. At this time, the BLE method can make up for these deficiencies.

Figure 3:
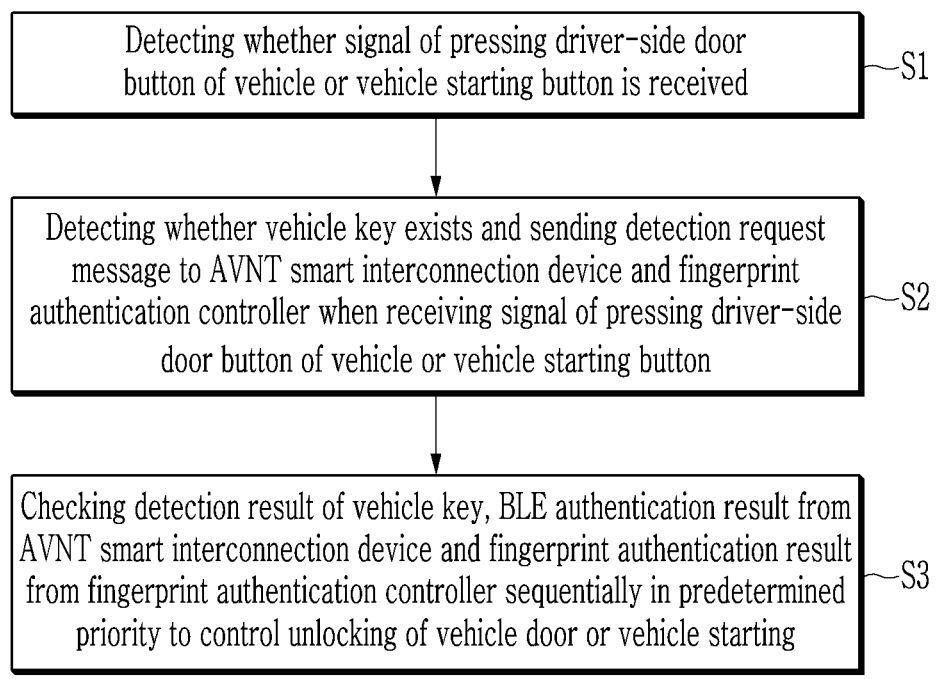
FIG. 3 is a flowchart of a vehicle authentication method based on BLE and fingerprint in some forms of the present disclosure.

FIG. 3 is a flowchart of a vehicle authentication method based on BLE and fingerprint in some forms of the present disclosure. As shown in FIG. 3, the central control processor 100 detects whether the signal of pressing the driver-side door button of the vehicle or the vehicle starting button is received at step S1, detects whether the vehicle key exists at step S2 when receiving the signal of pressing the driver-side door button of the vehicle or the vehicle starting button, and sends the detection request message to the AVNT smart interconnection device 110 and the fingerprint authentication controller 120 and checks the detection result of the vehicle key, the BLE authentication result from the AVNT smart interconnection device 110, and the fingerprint authentication result from the fingerprint authentication controller 120 sequentially in a predetermined priority to control the unlocking the vehicle door or the vehicle starting at step S3.

Alternatively, the central control processor 100 can detect the signal of the passenger-side door button of the vehicle. Then, when the signal of the passenger-side door button of the vehicle is detected, the central control processor 100 detects whether the vehicle key exists and sends the detection request message to the AVNT smart interconnection device 110 and the fingerprint authentication controller 120. If receiving the detection result that the vehicle key exists, the central control processor 100 executes the unlocking the vehicle door or the vehicle starting according to the detection result of the vehicle key, executes the unlocking the vehicle door or the vehicle starting according to the BLE authentication result from the AVNT smart interconnection device 110 if receiving the detection result that the vehicle key does not exist, and executes the unlocking the vehicle door or the vehicle starting according to the fingerprint authentication result from the fingerprint authentication controller 120 if receiving the BLE authentication result that the authenticated mobile device does not exist.

Alternatively, the central control processor 100 can detect the signal of the trunk open button of the vehicle. Then, when the signal of the trunk open button of the vehicle is detected, the central control processor 100 detects whether the vehicle key exists and sends the detection request message to the AVNT smart interconnection device 110 and the fingerprint authentication controller 120. If receiving the detection result that the vehicle key exists, the central control processor 100 executes the unlocking the vehicle door or the vehicle starting according to the detection result of the vehicle key, executes the unlocking the vehicle door or the vehicle starting according to the BLE authentication result from the AVNT smart interconnection device 110 if receiving the detection result that the vehicle key does not exist, and executes the unlocking the vehicle door or the vehicle starting according to the fingerprint authentication result from the fingerprint authentication controller 120 if receiving the BLE authentication result that the authenticated mobile device does not exist.

If none of the vehicle key, the authenticated mobile device, and the authenticated fingerprint information is detected, the logo of "No Fob+BLE+fingerprint" is displayed.

Figure 4:
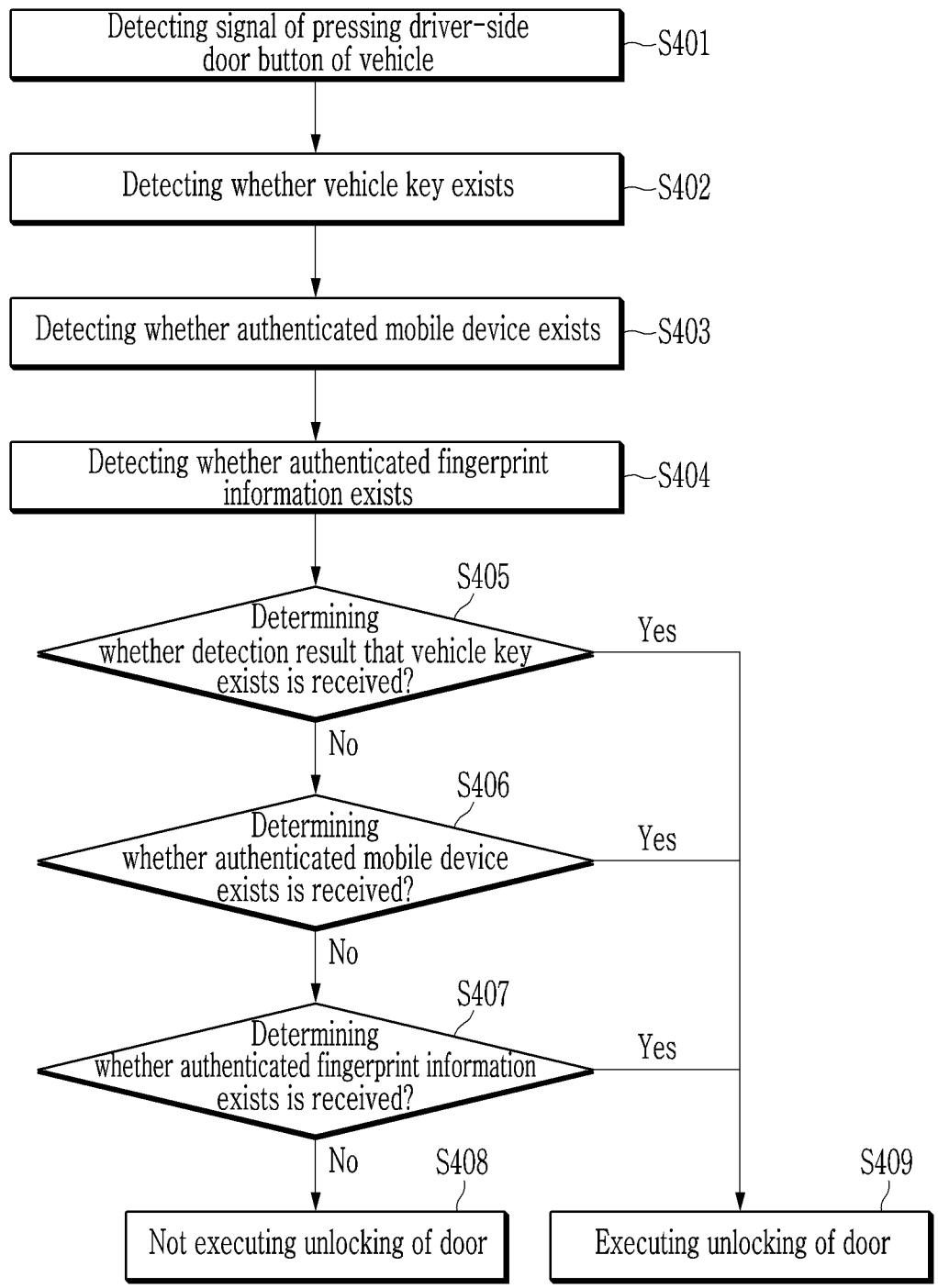
FIG. 4 is a flowchart of controlling door unlocking in a vehicle authentication system based on BLE and fingerprint in some forms of the present disclosure.

Referring to FIG. 4, processes of the vehicle authentication system based on BLE and fingerprint in some forms of the present disclosure will be described by exemplifying the unlocking of the door using the driver-side door button of the vehicle.

At step S401, the central control processor 100 detects the signal of pressing the driver-side door button of the vehicle.

At steps S402 to S404, whether the vehicle key exists is detected, whether the authenticated mobile device exists is detected, and whether the authenticated fingerprint information exists is detected.

At step S403, whether the authenticated mobile device exists is detected. That is, if the AVNT smart interconnection device 110 receives the detection request message from the central control processor 100, the AVNT smart interconnection device 110 detects the mobile device 150 within 3 m around the vehicle, establishes the detected mobile device 150 through the Bluetooth communication, and obtains the BLE authentication information of the detected mobile device 150. Then, the obtained BLE authentication information is compared with the pre-stored BLE authentication information. If the obtained BLE authentication information coincides with the pre-stored BLE authentication information, it is determined that the authenticated mobile device exists, and if the mobile device is not detected within 3 m around the vehicle or the BLE authentication information of the detected mobile device does not coincide with the pre-stored BLE authentication information, it is detected that the authenticated mobile device does not exist.

At step S404, whether the authenticated fingerprint information exists is detected. That is, if the fingerprint authentication controller 120 receives the detection request message from the central control processor 100, the fingerprint authentication controller 120 obtains the fingerprint information of the driver-side door handle fingerprint identification device 130. Then, the obtained fingerprint information is compared with the pre-stored fingerprint authentication information. If the obtained fingerprint information coincides with the pre-stored fingerprint authentication information, it is determined that the obtained fingerprint information is the authenticated fingerprint information. If the obtained fingerprint information does not coincide with the pre-stored fingerprint authentication information, it is determined that the obtained fingerprint information is not the authenticated fingerprint information.

At step S405, it is determined whether the detection result that the vehicle key exists is received. If the detection result that the vehicle key exists is received, unlocking of the vehicle door is executed according to the detection result of the vehicle key. If the detection result that the vehicle key does not exist, the AVNT smart interconnection device 110 sends the BLE authentication result and the distance information between the authenticated mobile device and the AVNT smart interconnection device 110 to the central control processor 100 in an encrypted manner.

At step S406, it is determined whether the BLE authentication result that the authenticated mobile device exists is received. If the BLE authentication result that the authenticated mobile device exists is received and the distance between the authenticated mobile device and the AVNT smart interconnection device 110 is within 3 m, the unlocking of the vehicle door can be executed. If the BLE authentication result that the authenticated mobile device does not exist is received, the fingerprint authentication controller 120 sends the fingerprint authentication result to the central control processor 100 in an encrypted manner.

At step S407, it is determined whether the fingerprint authentication result that the authenticated fingerprint information exists is received. If the fingerprint authentication result that the authenticated fingerprint information exists is received, the unlocking of the vehicle door is executed. If the fingerprint authentication information that the authenticated fingerprint information does not exist is received, the unlocking of the vehicle door is not executed and the warning module displays the logo of "No Fob+BLE+fingerprint".

Figure 5:
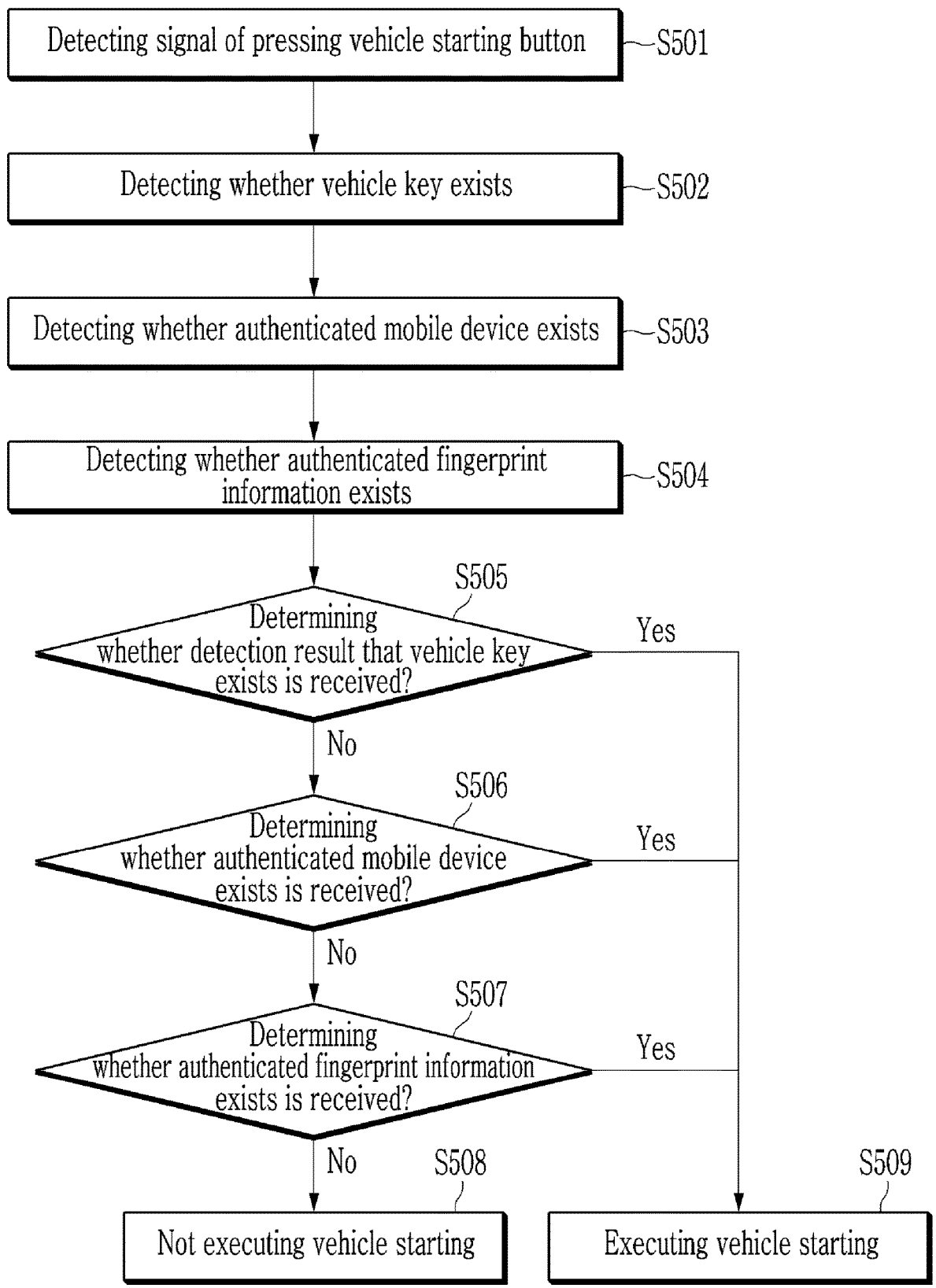
FIG. 5 is a flowchart of controlling vehicle starting in a vehicle authentication system based on BLE and fingerprint in some forms of the present disclosure.

Referring to FIG. 5, processes of the vehicle authentication system based on BLE and fingerprint in some forms of the present disclosure will be described by exemplifying the vehicle starting using the vehicle starting button.

At step S501, the central control processor 100 receives the signal of pressing the vehicle starting button.

At steps S502 to S504, whether the vehicle key exists is detected, whether the authenticated mobile device exists is detected, and whether the authenticated fingerprint information exists is detected.

At step S503, whether the authenticated mobile device exists is detected. That is, if the AVNT smart interconnection device 110 receives the detection request message from the central control processor 100, the AVNT smart interconnection device 110 detects the mobile device 150 within 1 m±0.2 m around the vehicle, establishes the detected mobile device 150 through the Bluetooth communication, and obtains the BLE authentication information of the detected mobile device 150. Then, the obtained BLE authentication information is compared with the pre-stored BLE authentication information. If the obtained BLE authentication information coincides with the pre-stored BLE authentication information, it is determined that the authenticated mobile device exists, and if the mobile device is not detected within 1 m±0.2 m around the vehicle or the BLE authentication information of the detected mobile device does not coincide with the pre-stored BLE authentication information, it is detected that the authenticated mobile device does not exist.

At step S504, whether the authenticated fingerprint information exists is detected. That is, if the fingerprint authentication controller 120 receives the detection request message from the central control processor 100, the fingerprint authentication controller 120 obtains the fingerprint information of the vehicle starting button fingerprint identification device 140. Then, the obtained fingerprint information is compared with the pre-stored fingerprint authentication information. If the obtained fingerprint information coincides with the pre-stored fingerprint authentication information, it is determined that the obtained fingerprint information is the authenticated fingerprint information. If the obtained fingerprint information does not coincide with the pre-stored fingerprint authentication information, it is determined that the obtained fingerprint information is not the authenticated fingerprint information.

At step S505, it is determined whether the detection result that the vehicle key exists is received. If the detection result that the vehicle key exists is received, the vehicle starting is executed according to the detection result of the vehicle key. If the detection result that the vehicle key does not exist, the AVNT smart interconnection device 110 sends the BLE authentication result and the distance information between the authenticated mobile device and the AVNT smart interconnection device 110 to the central control processor 100 in an encrypted manner.

At step S506, it is determined whether the BLE authentication result that the authenticated mobile device exists is received. If the BLE authentication result that the authenticated mobile device exists is received and the distance between the authenticated mobile device and the AVNT smart interconnection device 110 is within 1 m±0.2 m, the vehicle starting can be executed. If the BLE authentication result that the authenticated mobile device does not exist is received, the fingerprint authentication controller 120 sends the fingerprint authentication result to the central control processor 100 in an encrypted manner.

At step S507, it is determined whether the fingerprint authentication result that the authenticated fingerprint information exists is received. If the fingerprint authentication result that the authenticated fingerprint information exists is received, the vehicle starting is executed. If the fingerprint authentication information that the authenticated fingerprint information does not exist is received, the vehicle starting is not executed and the warning module displays the logo of "No Fob+BLE+fingerprint".

In some forms of the present disclosure, since the control method for unlocking the door or starting and unlocking the vehicle using the passenger-side door button and the trunk open button is similar to that for unlocking the door or starting the vehicle using the driver-side door button of the vehicle, detailed description thereof will be omitted.

Exemplary forms of the present disclosure provide a vehicle authentication system and method for controlling door unlocking and vehicle starting based on BLE and fingerprint, so that the vehicle can be used more conveniently and safely.

Although the exemplary method of the present disclosure is represented as a series of steps for clarity of description, it is not intended to limit the order in which the steps are performed, and each step can be performed simultaneously or in a different order as needed. In order to execute the method in some forms of the present disclosure, the steps may further include other steps, may include other steps except for certain steps, or may include other additional steps except for certain steps.

The various forms of the present disclosure are not complete list of all possible combinations, but are intended to describe representative aspects of the present disclosure, and what is described in the various forms may be applied independently or in two or more combinations thereof.

In addition, various forms of the present disclosure can be implemented by hardware, firmware, software, or a combination thereof. The hardware can be implemented as one or more of application-specific integrated circuits (ASICs), digital signal processors (DSPs), digital signal processing devices (DSPDs), programmable logic devices (PLDs), field programmable gate arrays (FPGAs), general-purpose processors, controllers, microcontrollers, microprocessors, etc.

The scope of the present disclosure is intended to include software or machine-executable instructions (for example, operating systems, application programs, firmware, programs, etc.) as well as non-volatile computer-readable media. Software or machine-executable instructions is programed such that operations according to the various exemplary forms can be executed on a device or a computer, and the non-volatile computer readable media is executable on a device or a computer storing such software or instructions.

While this disclosure has been described in connection with what is presently considered to be practical exemplary forms, it is to be understood that the disclosure is not limited to the disclosed forms. On the contrary, it is intended to cover various modifications and equivalent arrangements included within the spirit and scope of the appended claims.

What is claimed is:

1. A vehicle authentication system based on Bluetooth low energy (BLE) and fingerprint, comprising:
   an audio/video/navigation/telematics (AVNT) smart interconnection device mounted in a vehicle and configured to:
      detect a mobile device within a predetermined range from a vehicle;
      establish a communication with the detected mobile device via Bluetooth communication to obtain a BLE authentication information of the detected mobile device; and
      compare the obtained BLE authentication information with a pre-stored BLE authentication information to send a BLE authentication result to a central control processor in an encrypted form;
   a driver-side door handle fingerprint identification device mounted at a driver-side door handle and configured to:
      detect a fingerprint information of a vehicle user; and
      send the detected fingerprint information to a fingerprint authentication controller in the encrypted form;
   a vehicle starting button fingerprint identification device mounted on a starting button in the vehicle and configured to:
      detect the fingerprint information of the vehicle user; and
      send the detected fingerprint information to the fingerprint authentication controller in the encrypted form;
   the fingerprint authentication controller mounted in the vehicle and configured to:
      receive the fingerprint information from the driver-side door handle fingerprint identification device or the vehicle starting button fingerprint identification device; and
      compare the received fingerprint information with a pre-stored fingerprint authentication information to send a fingerprint authentication result in the encrypted form; and
   the central control processor mounted in the vehicle and configured to:
      receive the fingerprint authentication result from the fingerprint authentication controller;
      detect a signal of pressing a driver-side door button or the starting button of the vehicle;
      detect whether a vehicle key exists;
      send a detection request message to the AVNT smart interconnection device and the fingerprint authentication controller when receiving the signal of pressing the driver-side door button or the starting button of the vehicle; and
      check a detection result of whether the vehicle key exists, the BLE authentication result from the AVNT smart interconnection device, and the fingerprint authentication result from the fingerprint authentication controller sequentially in a predetermined priority to control unlocking a vehicle door or a vehicle starting.

2. The vehicle authentication system of claim 1, wherein the predetermined range from the vehicle is a distance range between the mobile device and the AVNT smart interconnection device and is within 3 m.

3. The vehicle authentication system of claim 1, wherein the central control processor is further configured to:
   unlock the vehicle door or the vehicle starting according to the detection result when it is detected that the vehicle key exists;
   unlock the vehicle door or the vehicle starting according to the BLE authentication result when it is detected that the vehicle key does not exist; and
   unlock the vehicle door or the vehicle starting according to the fingerprint authentication result when receiving the BLE authentication result that an authenticated mobile device does not exist.

4. The vehicle authentication system of claim 1, wherein the fingerprint authentication controller is configured to:
   determine that the received fingerprint information is an authenticated fingerprint information when it is determined that the received fingerprint information is consistent with the pre-stored fingerprint authentication information.

5. The vehicle authentication system of claim 1, wherein the central control processor, the AVNT smart interconnection device, and the fingerprint authentication controller communicate in the encrypted form via a controller area network (CAN).

6. The vehicle authentication system of claim 1, wherein the vehicle authentication system further comprises:
   a warning module mounted at an integrated display panel in the vehicle and configured to display a logo of "No Fob+BLE+Fingerprint" when none of the vehicle key, the authenticated mobile device, and the authenticated fingerprint information is detected.

7. The vehicle authentication system of claim 1, wherein the AVNT smart interconnection device is configured to:
   determine that the mobile device is an authenticated mobile device when it is determined that the obtained BLE authentication information is consistent with the pre-stored BLE authentication information; and
   send, to the central control processor, the BLE authentication result together with a distance information between the authenticated mobile device and the AVNT smart interconnection device.

8. The vehicle authentication system of claim 7, wherein the central control processor is further configured to:
   unlock the vehicle door when a distance between the authenticated mobile device and the AVNT smart interconnection device is within 3 m; and
   execute the vehicle starting when the distance between the authenticated mobile device and the AVNT smart interconnection device is greater than or equal to 0.8 m and less than or equal to 1.2 m.

9. A vehicle comprising:
a vehicle authentication system based on Bluetooth low energy (BLE) and fingerprint, further comprising:
an audio/video/navigation/telematics (AVNT) smart interconnection device mounted in a vehicle and configured to:
  detect a mobile device within a predetermined range from a vehicle;
  establish a communication with the detected mobile device via Bluetooth communication to obtain a BLE authentication information of the detected mobile device; and
  compare the obtained BLE authentication information with a pre-stored BLE authentication information to send a BLE authentication result to a central control processor in an encrypted form;
a driver-side door handle fingerprint identification device mounted at a driver-side door handle and configured to:
  detect a fingerprint information of a vehicle user; and
  send the detected fingerprint information to a fingerprint authentication controller in the encrypted form;
a vehicle starting button fingerprint identification device mounted on a starting button in the vehicle and configured to:
  detect the fingerprint information of the vehicle user; and
  send the detected fingerprint information to the fingerprint authentication controller in the encrypted form;
the fingerprint authentication controller mounted in the vehicle and configured to:
  receive the fingerprint information from the driver-side door handle fingerprint identification device or the vehicle starting button fingerprint identification device; and
  compare the received fingerprint information with a pre-stored fingerprint authentication information to send a fingerprint authentication result in the encrypted form; and
the central control processor mounted in the vehicle and configured to:
  receive the fingerprint authentication result from the fingerprint authentication controller;
  detect a signal of pressing a driver-side door button or the starting button of the vehicle;
  detect whether a vehicle key exists;
  send a detection request message to the AVNT smart interconnection device and the fingerprint authentication controller when receiving the signal of pressing the driver-side door button or the starting button of the vehicle; and
  check a detection result of whether the vehicle key exists, the BLE authentication result from the AVNT smart interconnection device, and the fingerprint authentication result from the fingerprint authentication controller sequentially in a predetermined priority to control unlocking a vehicle door or a vehicle starting.

10. A vehicle authentication method based on Bluetooth low energy (BLE) and fingerprint, comprising:
  detecting, by an audio/video/navigation/telematics (AVNT) smart interconnection device, a mobile device within a predetermined range from a vehicle;
  establishing, by the AVNT smart interconnection device, a communication with the detected mobile device via Bluetooth communication;
  comparing, by the AVNT smart interconnection device, BLE authentication information with a pre-stored BLE authentication information;
  sending, by the AVNT smart interconnection device, a BLE authentication result to a central control processor in an encrypted form;
  detecting, by a driver-side door handle fingerprint identification device, a fingerprint information of a vehicle user and sending the detected fingerprint information to a fingerprint authentication controller in the encrypted form;
  detecting, by a vehicle starting button fingerprint identification device, the fingerprint information of the vehicle user and sending the detected fingerprint information to the fingerprint authentication controller in the encrypted form;
  receiving, by the fingerprint authentication controller, the fingerprint information from the driver-side door handle fingerprint identification device or the fingerprint information from the vehicle starting button fingerprint identification device;
  comparing, by the fingerprint authentication controller, the received fingerprint information with a pre-stored fingerprint authentication information;
  sending, by the fingerprint authentication controller, a fingerprint authentication result to the central control processor in the encrypted form;
  detecting, by the central control processor, a signal of pressing a driver-side door button or a vehicle starting button of the vehicle;
  detecting, by the central control processor, whether a vehicle key exists when the signal of pressing the driver-side door button or the vehicle starting button of the vehicle is received;
  sending, by the central control processor, a detection request message to the AVNT smart interconnection device and the fingerprint authentication controller; and
  checking, by the central control processor, a detection result whether the vehicle key exists, the BLE authentication result from the AVNT smart interconnection device, and the fingerprint authentication result from the fingerprint authentication controller sequentially in a predetermined priority to unlock a vehicle door or a vehicle starting.

11. The vehicle authentication method of claim 10, wherein the predetermined range from the vehicle is a distance range between the mobile device and the AVNT smart interconnection device, and is within 3 m.

12. The vehicle authentication method of claim 10, further comprising:
  unlocking, by the central control processor, the vehicle door or the vehicle starting according to the detection result when it is detected that the vehicle key exists;
  unlocking, by the central control processor, the vehicle door or the vehicle starting according to the BLE authentication result when it is detected that the vehicle key does not exist; and
  unlocking, by the central control processor, the vehicle door or the vehicle starting according to the fingerprint authentication result when receiving the BLE authentication result that an authenticated mobile device does not exist.

13. The vehicle authentication method of claim 10, further comprising:
  determining, by the fingerprint authentication controller, that the received fingerprint information is an authenticated fingerprint information when the received fingerprint information is consistent with the pre-stored fingerprint authentication information.

14. The vehicle authentication method of claim 10, further comprising:
communicating in the encrypted form among the central control processor, the AVNT smart interconnection device, and the fingerprint authentication controller via a controller area network (CAN).

15. The vehicle authentication method of claim 10, further comprising:
displaying a logo of "No Fob+BLE+fingerprint" when none of the vehicle key, the authenticated mobile device, and the authenticated fingerprint information is detected.

16. The vehicle authentication method of claim 10, further comprising:
comparing, by the AVNT smart interconnection device, the obtained BLE authentication information with the pre-stored BLE authentication information;
determining that the mobile device is an authenticated mobile device when the obtained BLE authentication information is consistent with the pre-stored BLE authentication information; and
sending, to the central control processor, the BLE authentication result together with a distance information between the authenticated mobile device and the AVNT smart interconnection device.

17. The vehicle authentication method of claim 16, wherein unlocking the vehicle door or the vehicle starting according to the BLE authentication result includes:
unlocking the vehicle door when a distance between the authenticated mobile device and the AVNT smart interconnection device is within 3 m; and
executing the vehicle starting when the distance between the authenticated mobile device and the AVNT smart interconnection device is greater than or equal to 0.8 m and less than or equal to 1.2 m.

* * * * *